United States Patent [19]

Gött et al.

[11] 4,353,678

[45] Oct. 12, 1982

[54] MECHANISM FOR TRANSFERRING CUT-TO-LENGTH WIRES OUT OF A LOOSE BUNDLE OF WIRES INTO A SINGLE LAYER OF PARALLEL WIRES

[75] Inventors: Hans Gött; Josef Ritter; Klaus Ritter; Gerhard Ritter, all of Graz, Austria

[73] Assignee: EVG Entwicklungs-und Verwertungsgesellschaft m.b.H, Graz, Austria

[21] Appl. No.: 116,914

[22] Filed: Jan. 30, 1980

[30] Foreign Application Priority Data

Feb. 6, 1979 [AT] Austria .................................... 876/79

[51] Int. Cl.³ ............................................. B21F 23/00
[52] U.S. Cl. .................................... 414/748; 414/112; 198/454
[58] Field of Search ............... 414/745, 748, 114, 115, 414/112, 125, 129; 198/454, 453

[56] References Cited

U.S. PATENT DOCUMENTS

| | | | |
|---|---|---|---|
| 1,236,019 | 8/1917 | Tzibides | 198/454 |
| 2,525,305 | 10/1950 | Lombard | 414/745 X |
| 2,661,830 | 12/1953 | Total | 198/454 |
| 3,214,001 | 10/1965 | Callaghan | 414/748 X |
| 3,474,914 | 10/1969 | Kaplan | 414/748 |
| 3,774,779 | 11/1973 | White | 414/748 |
| 4,073,978 | 2/1978 | Womack et al. | 414/745 X |
| 4,249,841 | 2/1981 | Gött et al. | 414/745 X |

FOREIGN PATENT DOCUMENTS

| | | | |
|---|---|---|---|
| 2658777 | 6/1978 | Fed. Rep. of Germany | 414/748 |
| 2030124 | 4/1980 | United Kingdom | 198/453 |

*Primary Examiner*—Robert J. Spar
*Assistant Examiner*—Terrance L. Siemens
*Attorney, Agent, or Firm*—Ernest F. Marmorek

[57] ABSTRACT

The invention concerns a mechanism for transferring cut-to-length wires out of a loose bundle of wires into a single layer of parallel wires. The mechanism comprises a wire channel, for receiving the single layer of parallel wires, which is inclined to the horizontal. The upper end of the lower side of the inclined channel extends beyond the upper end of the upper side to form a rest for the loose bundle of wires. At least one wiper-cam is positioned above the extended end of the lower side of the channel and is pivotable to and fro in the longitudinal direction of the channel, the end face of the cam facing the lower side of the channel being spaced from the lower side by a distance such as to allow a single wire to pass therebeneath into the channel. The lower side of the channel can be moved relative to the upper side of the channel.

8 Claims, 2 Drawing Figures

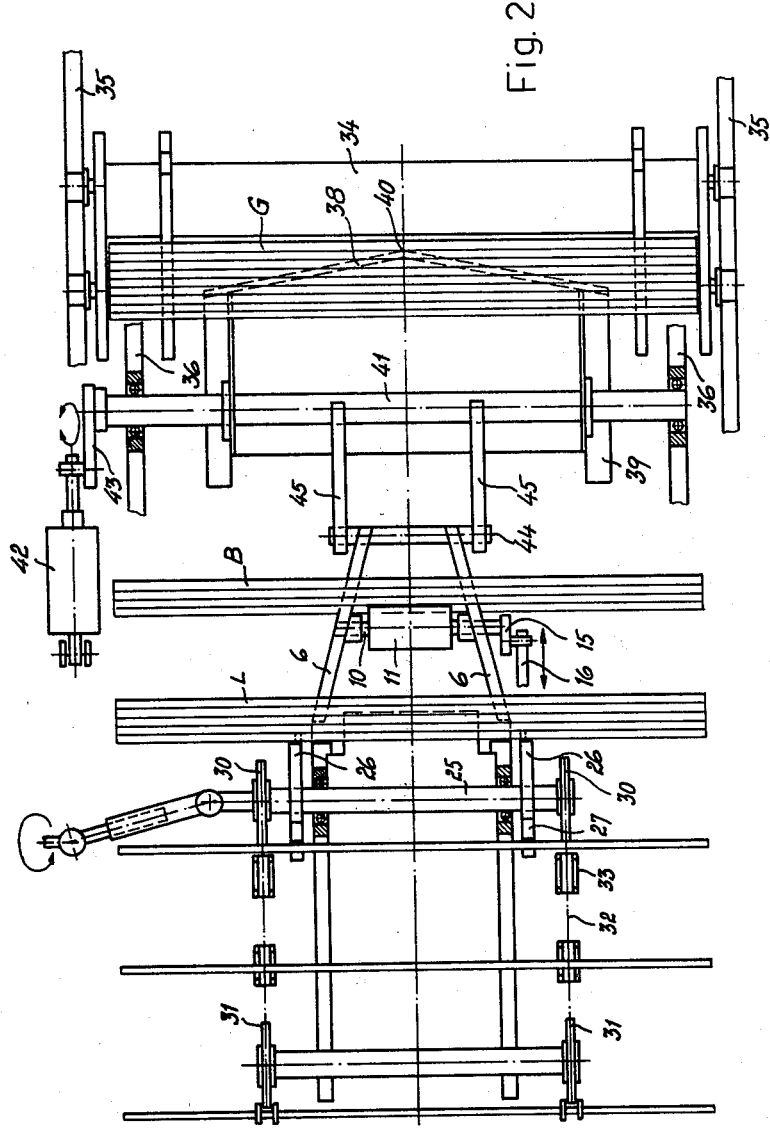

MECHANISM FOR TRANSFERRING CUT-TO-LENGTH WIRES OUT OF A LOOSE BUNDLE OF WIRES INTO A SINGLE LAYER OF PARALLEL WIRES

The invention relates to a mechanism for transferring cut-to-length wires out of a loose bundle of wires into a single layer of parallel wires, in particular for easing subsequent singling-out of the wires. Mechanism of this type are needed, for example, for feeding wires to processing machines such as grid welding machines.

BACKGROUND OF THE INVENTION

In known mechanisms of this type a member which brings about the transfer of the wires out of the loose bundle engages the wires from beneath. The member may have for example, the form of a threaded spindle cooperating with a wiper (see Austrian patent specification No. 334,717) or the form of a paddlewheel cooperating with guideways (see Austrian patent specification No. 334,168). These known mechanisms are relatively costly, require exact setting of the mechanism to the wire diameter and under unfavourable working conditions, such as particularly when the wires in the bundle are bent, are not adequately reliable in operation.

SUMMARY OF THE INVENTION

An object of the invention is therefore the production of a mechanism of the type described above, which is as simple and reliable in operation as possible and which may also be made so as to be easily adjustable to different diameters of wire.

According to the invention a mechanism for transferring cut-to-length wires out of a loose bundle of wires into a single layer of parallel wires, comprises a wire guide channel, for receiving a single layer of parallel wires, inclined to the horizontal, the upper end of the lower side of the inclined channel extending beyond the upper end of the upper side to form a rest for the loose bundle of wires; and at least one wiper-cam positioned above the extended end of the lower side of the channel and pivotable to and fro in a direction substantially along to the channel, the endface of the cam facing the lower side of the channel being spaced from the lower side by a distance such as to allow a single wire to pass therebeneath into the channel.

In use the loose bundle of wires lies in a depression bounded on one side by the extended lower side of the wire guide channel and on the other side by the wiper-cam, so that all of the wires in the bundle with the exception of those resting directly on the lower side of the channel take part in the to and fro motion of the cam and are constantly rearranged so that eventually they finally come to rest directly upon the lower side of the channel. The lowermost wires of the loose bundle can pass through underneath the moving wiper-cam and form, in the wire guide channel, the desired single layer of wires. The clearance of the upper side of the channel from the lower one is so small that no wire can lie over the one preceding it.

Particularly high reliability in operation is achieved if the end face of the wiper-cam, facing the lower side of the channel, is curved cylindrically about its pivot axis because a large amplitude of the swinging motion of the cam may be obtained without impairing the width of the channel through which the wires in the region of the cam must pass.

In order to facilitate the entry of the wires into the wire guide channel it is preferable if the upper side of the latter has a curved upper end which widens the entry to the channel.

For adaption of the mechanism to different diameters of wire the lower side of the wire guide channel may be made so that it can be shifted with respect to the upper side and with respect to the wiper-cam along a guide slide.

BRIEF DESCRIPTION OF THE DRAWING

One example of a mechanism according to the invention will now be described with reference to the accompanying drawings, in which:

FIG. 2 is a plan view of the mechanism of FIG. 1, where the upper side-part of the wire guide channel and the supporting structure have been omitted for simplification of the drawing.

DESCRIPTION OF THE PREFERRED EMBODIMENTS

Figure 1:
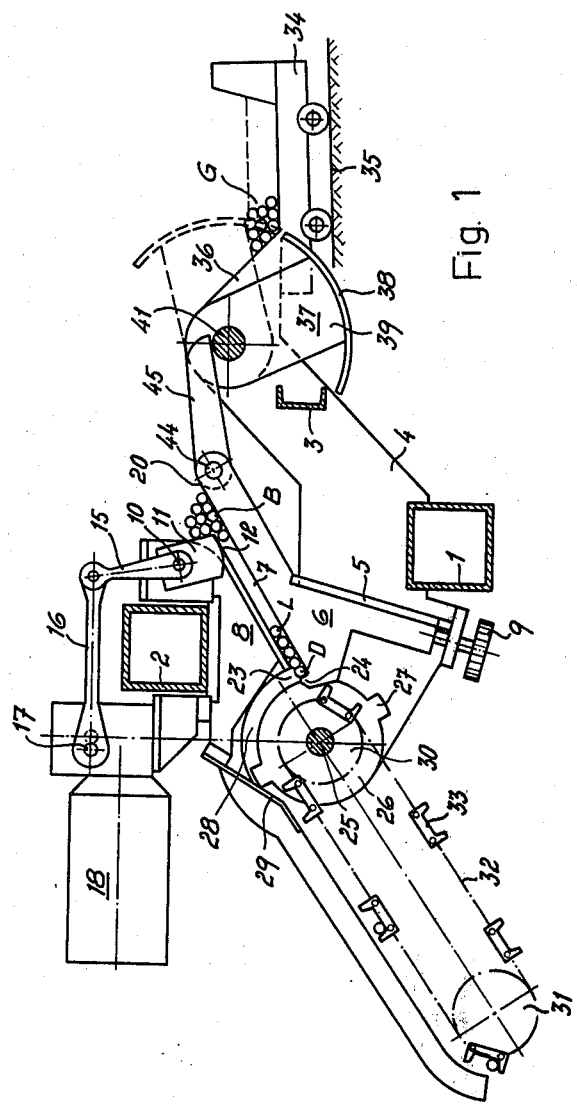
FIG. 1 is a side elevation showing the mechanism diagrammatically.

The individual parts of the mechanism are carried by crossbeams 1, 2 and 3 of a machine frame (which is not illustrated further). To the crossbeam 1 is fastened as least one bearer plate 4 which forms a sliding guide 5 for the lower side part 6 of a wire guide channel 7 inclined to the horizontal. The upper side part 8 of this channel 7 is fastened to the crossbeam 2. Each of the two side parts 6 and 8 of the channel may be made in one piece or may be composed of two or more plates. The faces of the edges of the side parts 6 and 8 face one another and are parallel with one another and the clearance between them may be altered by shifting the lower side part 6 in the sliding guide 5 by means of an adjusting screw 9. In this way the depth of the channel may be simply adjusted to the diameter of the wires to be processed. The upper side part 8 is rounded off at its higher end and thus forms a widened entry opening for the channel 7.

Above the entry to the channel 7 a wiper-cam 11 is supported so as to be able to swing to and fro about a fixed shaft 10, and its endface 12, facing the lower side part 6, is curved cylindrically, coaxially with the axis of swing 10 and has a clearance from the lower side part 6 which is only a little bigger than the diameter of the wires to be processed. The wiper-cam 11 is connected to a rocking lever 15 in turn connected, by a connecting rod 16 to a crank 17 which is driven by a motor 18 mounted on the crossbeam 2. By this means the wiper-cam 11 can be set in swinging motion to free the wires from one another, allowing them to move into the inclined wire guide channel 7, under the action of gravity.

The lower side part 6 projects at the higher end beyond the upper side part 8 at its top end, to serve as a wire rest 20 which in cooperation with the wiper-cam 11 forms a depression in which a loose bundle B of wires may be laid.

The lower side part 6 is prolonged also at its lower end beyond the upper side part 8 of the channel, by a distance corresponding approximately to one diameter of a wire, and carries a stop 24 for the single layer L of wires lying in the channel. Between the lower end of the upper side part 8 of the channel and the stop 24 a channel opening 23 is formed, the clear width of which is altered at the same time as the clear width of the channel 7. Preferably for this purpose the lower side part 6 of the channel can be shifted in its sliding guide 5 at an angle of approximately 45° with respect to the upper side part 8 of the channel.

The wires may be removed singly from the stop 24 by means of a carrier 26, 27. For this purpose, in the embodiment illustrated, two discs 26 are seated on a driven shaft 25, two or more projections 27 being provided on their peripheries, the height of which is so dimensioned that upon rotation of the discs 26 they can lift the foremost wire D of the single layer L, which is resting against the stop 24 and carry it round the shaft 25 in a circular path 28. A spring tongue 29 holds the lifted wire in contact against the discs 26 even after passing beyond the zenith of its path of motion.

If the mechanism described is lying directly in front of a processing machine, say a grid welding machine, the wire removed in the process described may, directly after emerging from the slit formed between the discs 26 and the spring tongue 29, be transferred to a guide in which the wire can now be conveyed into the processing machine in the direction of its longitudinal extent and by means which are known and which therefore do not form the object of the invention and which are not illustrated in the drawings.

In the case of a greater separation between the mechanism of the invention and the processing machine, sprockets 30 may be provided coaxially with the discs 26 to move in synchronism with them, the sprockets 30 cooperating with idler sprockets 31 to drive endless conveyor chains 32 along which wire receivers 33 are arranged at intervals. In this embodiment the rods are transferred from the discs 26 to the wire receivers 33 and conveyed by the latter to the processing machine.

In order to ensure optimum operating conditions for the wiper-cam 11, the wire bundle B lying in the depression between this cam 11 and the rest 20 should not be too bulky. Since, normally, wires are delivered in large bundles, a device is advantageously connected in front of the mechanism, as illustrated, for the separation of smaller bundles of wires from a large loose bundle of wires, the device delivering the small bundles of wires onto the wire rest of the mechanism.

In the embodiment illustrated a conveyor truck 34 is arranged on an inclined rollway 35 for this purpose. The conveyor truck 34 may be pushed by hand up to the highest point of the rollway 35 and there be loaded with a large bundle G of loose wires cut to length.

As soon as the conveyor truck 34 is released again it moves by gravity down the rollway 35 until the large loose bundle of wires G comes into contact with stop-plates 36 and arrives within the working range of a pick-up mechanism 37. This consists of a scoop 38 which has a part-cylindrical shell which, by means of swinging arms 39, can be carried past the stop-plates 36.

The scoop 38 has in the centre of its front edge a point 40 which can easily penetrate into the disordered loose bundle of wires G. Its swinging arms 39 are fixed for rotation on a shaft 41 which can be rotated by means of an operating cylinder 42 and a crank 43 so that the scoop 38 can be moved out of the position shown in FIG. 1 in solid line into the position shown in the same FIG. in dotted line, so that it separates out from the bundle of wires G and carries with it the wires lying between the stop-plates 36 and the scoop 38.

Subsequent to this separation, the wires (as may likewise be seen from FIG. 1) are raised in order to roll under gravity along the swinging arms 39 and rails 45 supported pivotally at 44 (which provide a connection between the arms 39 and the lower side part 6 of the channel) downwards until they strike against the wiper-cam 11 in front of which they dam up into a multilayer small bundle B.

We claim:

1. A mechanism for transferring cut-to-length wires out of a loose bundle of wires into a single layer of parallel wires, said mechanism comprising an inclined wire channel, for receiving a single layer of parallel wires, said channel having an upper side and a lower side and the upper end of said lower side extending beyond the upper end of said upper side to form thereby a rest for said loose bundle of wires; at least one wiper-cam, said wiper-cam being positioned above said extended end of said lower side of said channel; and means for pivoting said wiper-cam to and fro in a direction substantially along said channel, said wiper-cam having an end face facing said lower side of said channel, said face being arcuately curved cylindrically about its pivot and spaced from said lower side by a distance such as to allow a single wire to pass therebeneath into said channel.

2. A mechanism according to claim 1, in which said upper side of said channel in the region of said wiper-cam is curved away from said lower side to form an entrance.

3. A mechanism according to claim 1, including means for moving said lower side of said channel relative to said upper side of said channel and said wiper-cam.

4. A mechanism according to claim 3, including a guide slide, said lower side of said channel being movable along said guide slide.

5. A mechanism according to claim 3, wherein said lower side of the channel is movable at an angle of substantially 45° with respect to said upper side.

6. A mechanism according to claim 1, in which said lower side of said inclined channel has an extension at its lower end beyond said upper side, said extension having a stop for holding said single layer of wires lying in the channel, the length of said extension corresponding substantially to the depth of the said channel.

7. A mechanism according to claim 6, including a carrier positioned at said lower end of said inclined channel, to lift-up individual wires resting in turn against said stop.

8. A mechanism according to claim 1, including a device is located in front of said upper end of said channel for separating smaller loose bundles of wires from a larger loose bundle of wires and for transferring said smaller bundles onto said rest.

* * * * *